United States Patent [19]

Nomura

[11] Patent Number: 4,519,367
[45] Date of Patent: May 28, 1985

[54] CARBURETOR

[75] Inventor: Isshi Nomura, Aichi, Japan

[73] Assignee: Aisin Seiki Kabushiki Kaisha, Kariya, Japan

[21] Appl. No.: 461,708

[22] Filed: Jan. 28, 1983

[30] Foreign Application Priority Data

Jan. 28, 1982 [JP] Japan ................... 57-12292

[51] Int. Cl.³ .............................................. F02M 7/16
[52] U.S. Cl. ................................ 123/440; 123/179 G; 123/432
[58] Field of Search .......... 123/179 G, 180 R, 180 A, 123/180 T, 438, 440, 432, 443, 308

[56] References Cited

U.S. PATENT DOCUMENTS

| | | | |
|---|---|---|---|
| 1,002,699 | 9/1911 | Jouffret et al. | 123/180 A |
| 1,069,502 | 8/1913 | Wadsworth | 123/180 A |
| 2,036,020 | 3/1936 | Chandler | 123/180 A X |
| 3,364,911 | 1/1968 | Baudry et al. | 123/432 X |
| 3,780,718 | 12/1973 | Nambu | 123/179 G |
| 3,835,831 | 9/1974 | Ross | 123/179 G |
| 4,061,118 | 12/1977 | Kiyota | 123/443 |
| 4,119,074 | 10/1978 | Masaki et al. | 123/440 |
| 4,364,354 | 12/1982 | Kosuge et al. | 123/438 X |

Primary Examiner—Tony M. Argenbright
Attorney, Agent, or Firm—Sughrue, Mion, Zinn, Macpeak & Seas

[57] ABSTRACT

A carburetor of the type having a first main air passage with a venturi and throttle valve located therein is provided with second and third auxilliary air passages each of which are connected to the first main air passage upstream of the venturi. A second auxilliary air passage is adapted to be connected to the intake manifold of the engine and a first solenoid control valve is located in the second auxilliary air passage to control the flow of air therethrough. The first fuel passage is connected between a fuel supply chamber and the venturi of the first main air passage, the third auxilliary air passage may be connected directly to the first fuel passage or to an auxialliary fuel passage which is connected between the first fuel passage and a venturi located in the second auxilliary air passage. A solenoid control device is located in the third auxilliary air passage to control the flow of air to either fuel passage. The third auxilliary air passage may also be connected to the first fuel passage at a point intermediate the fuel supply chamber and the point of connection between the first fuel passage and the second auxilliary fuel passage to supply air to both fuel passages simultaneously. The two solenoid control valves may receive signals from the microcomputer which in turn may receive signals from various sensors indicative of engine operating conditions.

4 Claims, 8 Drawing Figures 4,519,367

CARBURETOR

BACKGROUND OF THE INVENTION

The present invention is directed to carburetors for internal combustion engines and more particularly to carburetors for controlling the air-fuel mixture in response to a signal based on several different parameters related to the operation of the internal combustion engine.

Most carburetors for internal combustion engines are provided with an air cleaner at the air intake side thereof, and are connected at the discharge side to an intake manifold of an internal combustion engine. Such a carburetor is provided with a main fluid passage having a venturi portion therein. A fuel passage is arranged between the venturi and a fuel float chamber so that the fuel is drawn into the venturi portion to be mixed with the air passing therethrough. In order to improve the evaporation of the fuel an air bleed passage is usually arranged between the main air passage upstream of the venturi portion and the fuel passage. Additionally, an actuator of the accelerator pump type is arranged to positively prevent temporary leanness of the air-fuel mixture upon suddenly increasing the degree of throttle opening during acceleration from an engine idling or low speed condition. An actuator having a diaphragm and piston is also arranged to provide fuel to the main fuel system when the intake manifold vacuum pressure becomes lower than a predetermined value to adjust the air-fuel mixture ratio upon full load conditions of engine operation in those situations where the air-fuel ratio is set at an economical level. A choke valve and associated actuator are also arranged to control the quantity of air supplied to thereby obtain a suitable air-fuel mixture in response to engine operating conditions, as for example, when the engine is started in cold conditions.

In view of the foregoing description of a conventional carburetor it is apparent that conventional carburetors are extremely complex in construction and each actuator described above is operated independently. Therefore, the ratio of the air-fuel mixture varies greatly and is not controlled smoothly.

SUMMARY OF THE INVENTION

The present invention provides a new and improved carburetor which obviates the above-mentioned drawbacks associated with conventional carburetors.

The present invention provides a new and improved carburetor which is simpler in construction while still providing a smooth, economical control of the air-fuel ratio at all times under varying operating conditions.

The present invention provides a new and improved carburetor comprising a first air passage, the upper portion of which is disposed in communication with the atmosphere through suitable air filter means and the lower portion of which is connected to the intake manifold in an internal combustion engine, said first air passage having first venturi means and a throttle valve located therein, a first fuel passage having one end thereof open to said first venturi means and the other end of which is disposed in communication with the fuel supply chamber, a second air passage having one end thereof open to said first air passage downstream of said throttle valve and the other end thereof open to said first air passage upstream of said first venturi means, said second air passage having second venturi means therein, a first valve device positioned within second air passage for controlling the quantity of air passing therethrough, a second fuel passage having one end thereof open to said second venturi means and the other end of which is in communication with said fuel supply chamber, a third air passage having one end thereof open to said second fuel passage and the other end thereof open to said first air passage upstream of said first venturi means and a second valve device positioned within said third air passage for controlling the quantity of air passing therethrough.

The foregoing and other objects, features and advantages of the present invention will be apparent from the following more particular description of preferred embodiments of the invention as illlustrated in the accompanying drawings.

DETAILED DESCRIPTION OF THE INVENTION

Figure 1:
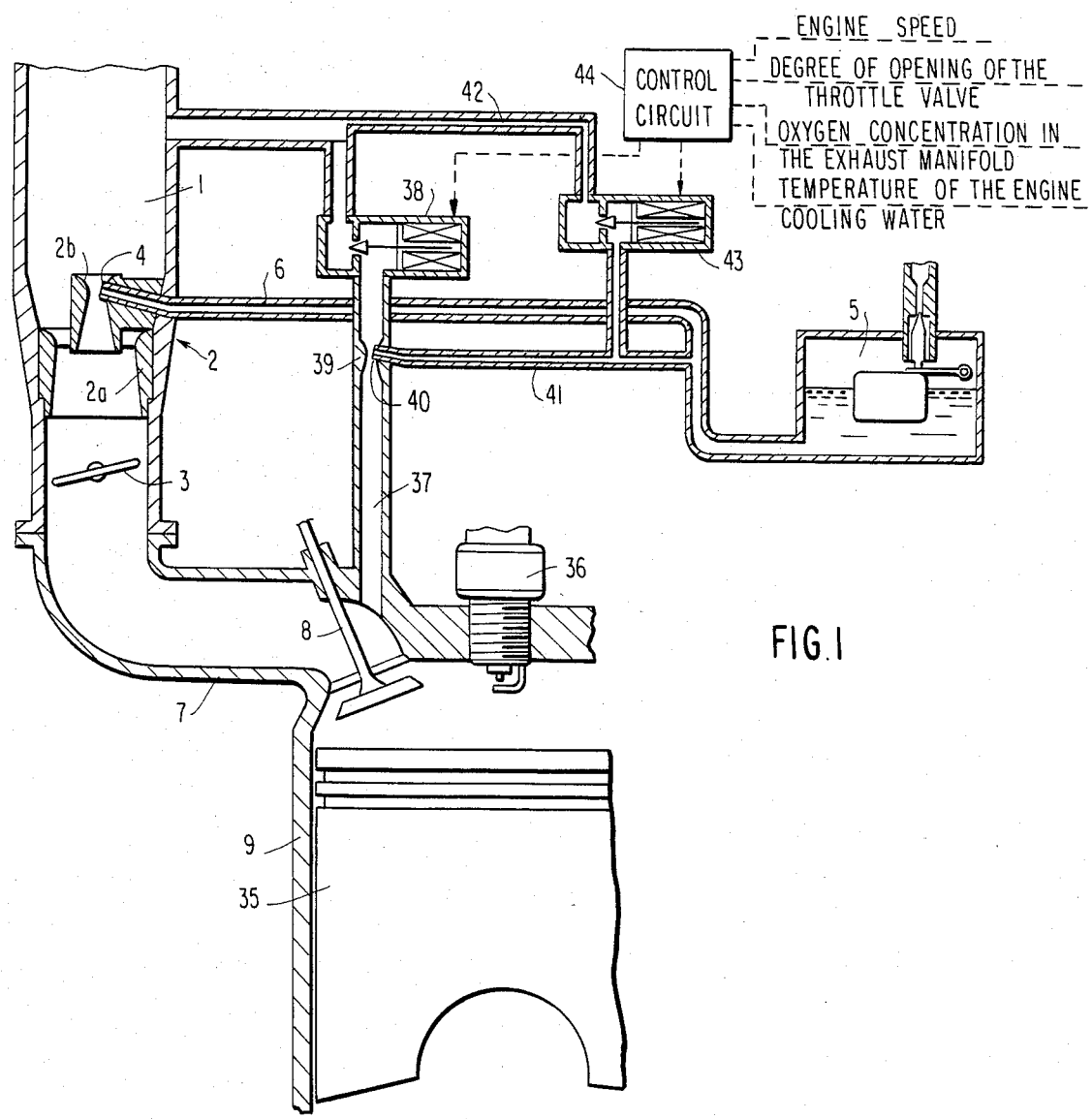
FIG. 1 is a schematic cross sectional view of a carburetor and its associated parts according to the present invention.

As best seen in FIG. 1, a carburetor is provided with an air passage 1 for receiving atmospheric air through a suitable air cleaner (not shown) having the main venturi 2 and a throttle valve 3 located therein. The main venturi 2 is of the double venturi type wherein an inner venturi 2b is open to the throat portion of an outer venturi 2a and a main fuel nozzle 4 is in communication with the throat portion of the inner venturi 2b. The nozzle 4 is in communication with one end of a first fuel passage 6, the other end of which is connected to a fuel float chamber 5. The lower portion of the main air passage 1 is disposed in communication with a representative cylinder 9 of an internal combustion engine through an intake manifold 7 and a suction valve 8. The piston 35 is located within the cylinder 9 for reciprocation and an ignition plug 36 is located in the upper end of the cylinder 9.

An air bypass passage 37 has one end thereof in communication with the air passage 1 upstream of the main venturi 2 and the other end thereof disposed in communication with the intake manifold 7. A solenoid actuated valve device 38 is positioned within the bypass passage 37 to control the air flow in proportion to the applied electric current. A secondary venturi 39 is located in the bypass passage 37 downstream of the solenoid actuated valve device 38. A secondary fuel nozzle 40 is in communication with the throat portion of the secondary venturi 39 and the secondary nozzle 40 is in communication with one end of a second fuel passage 41, the other end of which is connected to the float chamber 5.

An air bleed passage 42 is also in communication with the air passage 1 upstream of the main venturi 2 at one end thereof with the other end being in communication with the second fuel passage 41. A second solenoid actuated valve device 43 is disposed within the passage 42. A control circuit 44 is operatively connected to the solenoid actuated valve devices 38 and 43 for controlling the operations of the valve devices in response to engine speed, the degree of opening of the throttle valve associated with the accelerator pedal, the concentration of oxygen within the exhaust manifold, and the temperature of the engine cooling water whereby the rate and quantity of the air-fuel mixture being introduced into the cylinder 9 is controlled.

Figure 2B:
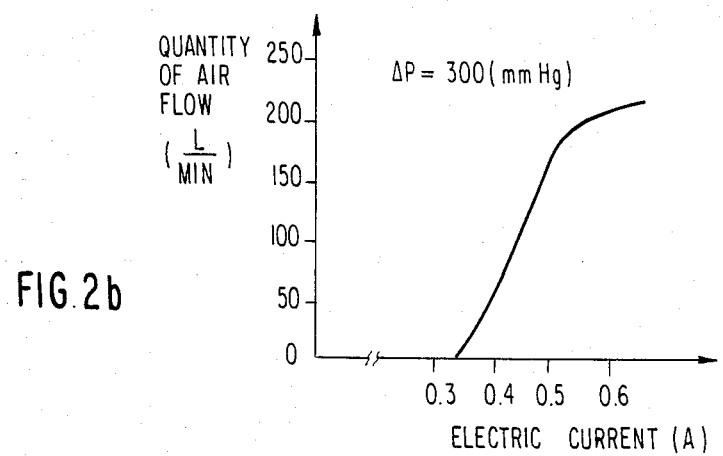
FIG. 2b is a graph showing the characteristics of the solenoid actuated valve devices of FIG. 1.
Figure 2A:
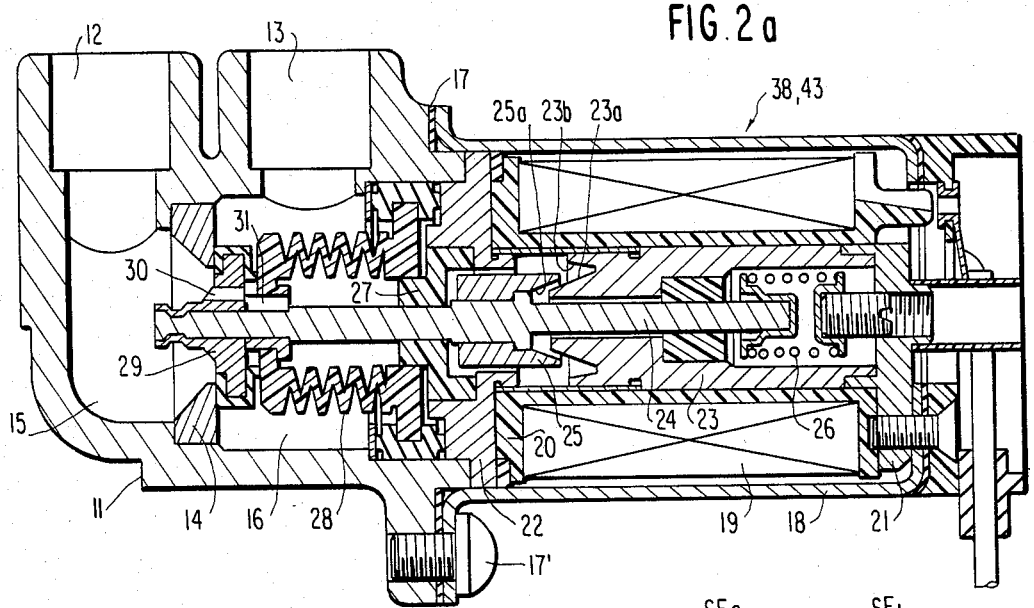
FIG. 2a is an enlarged cross sectional view of one of the solenoid actuating valve devices shown in FIG. 1.

The solenoid actuated valve devices 38 and 43 are of similar construction which is shown in FIG. 2a. The housing 11 is provided with first and second ports 12 and 13 and a valve seat 14 secured within the housing 11 to define first and second chambers 15 and 16 which are in communication with the first and second ports 12 and 13, respectively. A coil case 18 of magnetic material is secured to the housing 11 by means of bolts 17' and an annular seal member 17 is interposed between the case 18 and the housing 11. A bobbin 20 upon which a coil 19 is wound is located within the case 18 and is supported by end plates 21 and 22 of magnetic material. A hollow stationary core 23 of magnetic material is secured to the end plate 21 and a guide rod 24 of non-magnetic material passes through the stationary core 23. A moveable core 25 of magnetic material is secured to the guide rod 24 and is biased to the left as viewed in FIG. 2a by means of coil spring 26. One end of the rod 24 extends through a bearing 27, bellows 28, and an aperture in the valve seat 14. A valve member 29 is secured to the end of the rod 24 for cooperation with the valve seat 14. The interior of the bellows 28 is disposed in communication with the first chamber 15 or the second chamber 16, by means of the passages 30 and 31 in response to the axial movement of the rod 24.

When the coil 19 receives an electric current, the magnetic flux which circulates through the fixed core 23, the moveable core 25, the base 22, casing 18, and base 21, will generate an attractive force to draw the core 25 towards the core 23. Therefore, the rod 24 is moved to the right until the magnetic force and the biasing force of the spring 26 are balanced so that the valve member 29 is spaced from the valve seat 14 by a distance which is determined by the magnetic force. The left end of the fixed core 23 as viewed in FIG. 2a is provided with an inner tapered surface 23a and an outer tapered surface 23b which diverge relative to each other towards the left end of the fixed core 23. The right end of the moveable core 25 is also provided with a tapered surface 25a which is complementary to the tapered surface 23a on the fixed core. Accordingly, the amount of movement of the rod 24 which is related to the gap between the surfaces 23a and 25a is proportional to the level of applied electric current over a wide range. As a result, the flow of electric current through the coil 19 and the degree of opening of the valve member are in proportion to each other as seen in the graph of FIG. 2b wherein there is a substantially straight line relationship over a wide range.

Figure 3:
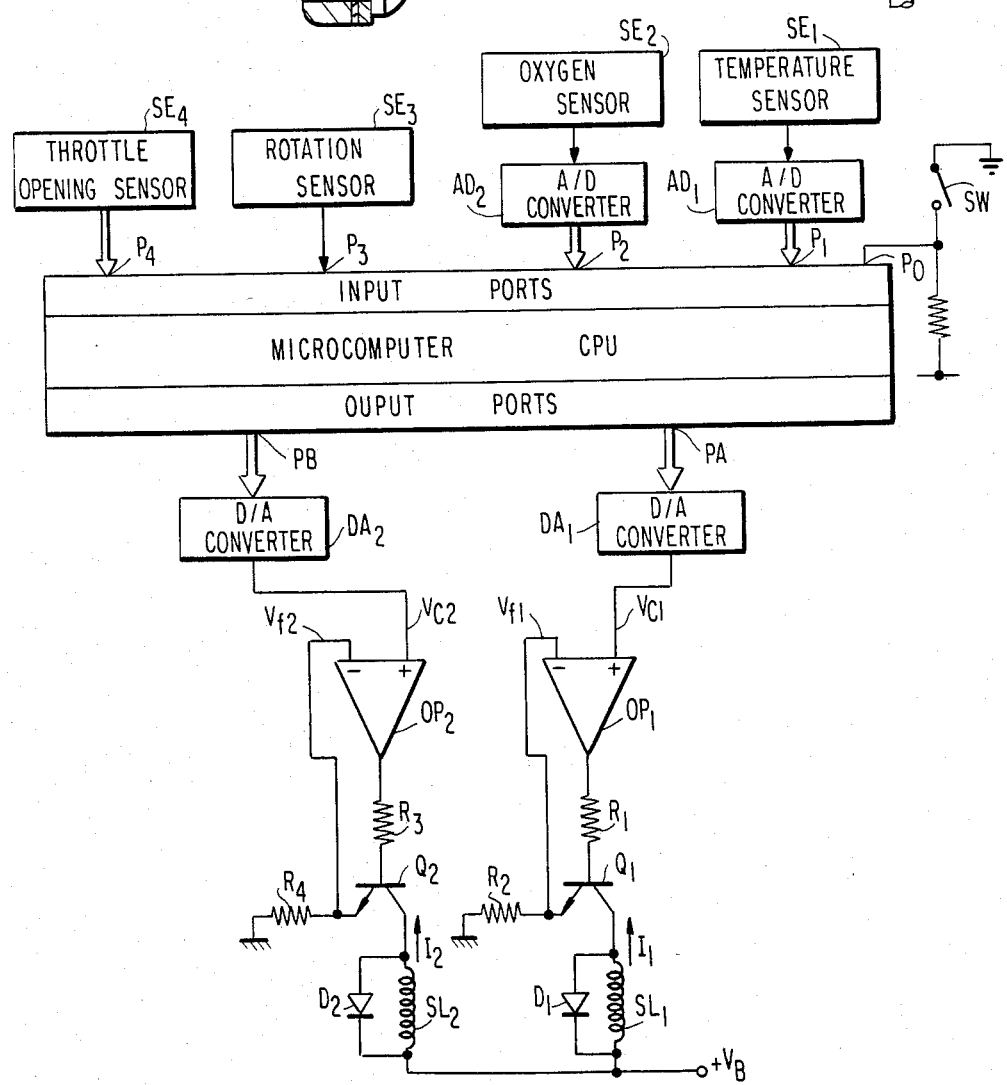
FIG. 3 is a schematic circuit diagram for controlling the solenoid actuated valve devices.

In FIG. 3, the coils $SL_1$ and $SL_2$ denote the coils of the solenoid actuated valve devices 38 and 43, respectively. One end of each solenoid $SL_1$ and $SL_2$ is connected to the positive terminal of a battery through suitable switching means, while the opposite end of each solenoid is connected to the collector of transistors $Q_1$ and $Q_2$, respectively. Diodes $D_1$ and $D_2$ which are connected in parallel with the coils $SL_1$ and $SL_2$ to protect the transistors $Q_1$ and $Q_2$ from high voltage which may be generated by a counter electromotive force in the solenoids. The positive terminal of operational amplifiers $OP_1$ and $OP_2$ receive output voltages $V_{C1}$ and $V_{C2}$ from converters $DA_1$ and $DA_2$, respectively, while the negative terminal of each operational amplifier receives a negative voltage $V_{f1}$ and $V_{f2}$, respectively, corresponding to the electric currents flowing through the transistors $Q_1$ and $Q_2$, respectively. The outputs of microcomputer CPU are connected to the converters $DA_1$ and $DA_2$, respectively. One input of the microcomputer CPU is connected to a temperture sensor $SE_1$ through a convertor $AD_1$ to thereby obtain information in response to changes in temperature of the engine coolant. Another input of the microcomputer CPU is connected to an oxygen sensor $SE_2$ through convertor $AD_2$ to obtain information relating to the concentration of oxygen within the exhaust gases. A further input of the microcomputer CPU is connected to a rotation sensor $SE_3$ for obtaining information with respect to the number of engine revolutions, and a still further input of the microcomputer CPU is connected to a throttle opening sensor $SE_4$ to obtain information relating to the degree of opening of the throttle valve. The temperature sensor $SE_1$ may be a thermistor, the oxygen sensor $SE_2$ may be of stabilized zirconium zircona which is positioned within the engine exhaust manifold, the rotary sensor $SE_3$ may detect the revolutions of the engine crankshaft to generate corresponding pulses, and the throttle opening sensor $SE_4$ may be an absolute encoder which delivers a binary code signal. A switch SW prevents operation of a valve device 38.

The control of the electric current which flows through the solenoids $SE_1$ and $SE_2$ is as follows.

When the output PA of the microcomputer CPU delivers a prescribed binary code, the converter $DA_1$ delivers an analog voltage $V_{C1}$ corresponding to the prescribed code. If $V_{C1} > V_{f1}$, the output of the operational amplifier $OP_1$ is at a high level to thereby turn the transistor $Q_1$ on so that an electric current $I_1$ flows through the solenoid coil $SL_1$. Since the feedback voltage $V_1$ is the voltage at the terminal of the resistor $R_2$, the voltage $V_{f1}$ becomes equal to $R_2I_1$ and therefore the voltage $V_{f1}$ changes in response to changes in the current $I_1$. When the electric current $I_1$ reaches a predetermined value, $V_{C1}$ becomes substantially equal to $V_{f1}$, and the output of the operational amplifier $OP_1$ reaches a prescribed level so that the transistor $Q_1$ controls the electric current $I_1$. Similarly, when the output PB delivers a prescribed binary code, the converter $DA_2$ delivers a corresponding output voltage $V_{C2}$. The transistor $Q_2$ is so controlled that the operational amplifier $OP_2$ is operated so as to have $V_{C2}$ approximately equal to $V_{f2}$, so that the electric current $I_2$ which flows the solenoid $SL_2$ reaches the prescribed value in response to the binary code of output PB.

Figure 4:
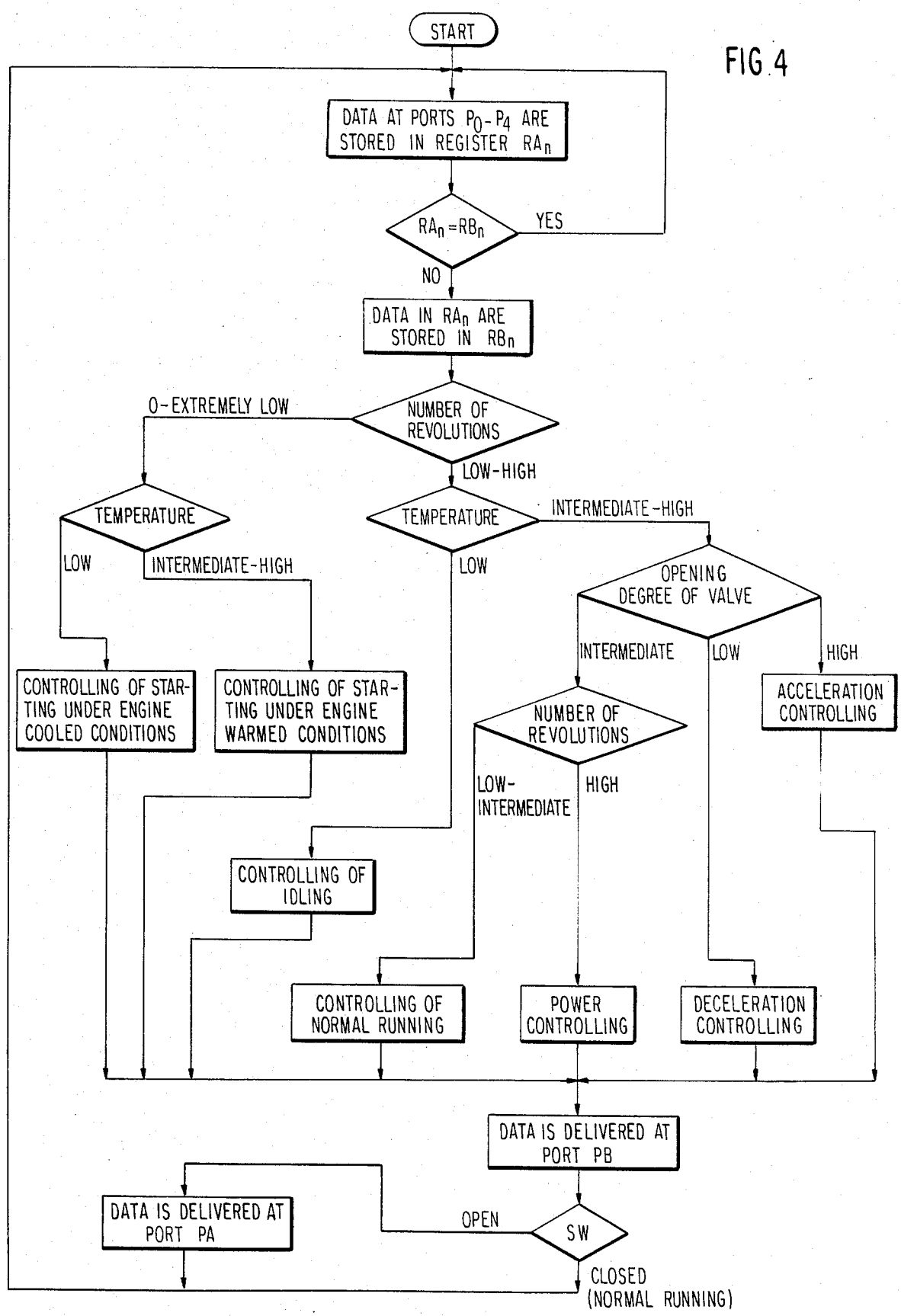
FIG. 4 is a flow diagram showing the operation of the carburetor according to the present invention.

The following Table I shows the control conditions for solenoid actuated valve devices 38 and 43, corresponding to operating conditions of the vehicle engine and FIG. 4 shows a flow diagram of the control.

TABLE I

| ENGINE CONDITIONS | OPENING DEGREE OF SOLENOID VALVE 38 (BY CONTROL OF OUTPUT A) | DESIRED RATE OF AIR-FUEL MIXTURE | OPENING DEGREE OF SOLENOID VALVE 43 (BY CONTROL OF OUTPUT PB) |
|---|---|---|---|
| I Starting of engine under cooled condition | Open, controlled in response to the number of engine revolutions | R | Closed, control of rate of air-fuel mixture |
| II Starting of engine under warmed condition | Open, controlled in response to the number of engine revolutions | N | Intermediate, control of rate of air-fuel mixture |
| III Idling Condition | Intermediate, controlled in response to the number of engine revolutions | R ↓ N | Closed ↓ Intermediate control of rate of air-fuel mixture |
| IV Acceleration Condition | Open ↓ Intermediate, controlled in response to opening degree of valve 3 | R ↓ N | Closed ↓ Intermediate control of rate of air fuel mixture |
| V Deceleration Condition | Open, controlled in response to rate of air-fuel mixture | L | Open, control of rate of air-fuel mixture |
| VI High load (power) Condition | Open, controlled in response to opening degree of valve 3 | R | Closed, control of rate of air-fuel mixture |
| VII Normal running Condition | Intermediate (opening degree is fixed) | N | Intermediate, control of rate of air-fuel mixture |

In the above table R denotes a rich air-fuel mixture, N denotes an intermediate air-fuel mixture, and L indicates a lean air-fuel mixture. With reference to the above table, the operation of the valve devices will be explained in detail.

I. Starting the engine under cold conditions:

Since the temperature is low, there will be substantial friction between the rotating portions of the engine so that a relatively large starting torque is required. However, since the fuel will be only slightly vaporized, a highly concentrated air-fuel mixture should be supplied to the vehicle engine. Therefore, the valve member of the solenoid actuated valve device 43 is closed to thereby reduce the quantity of air bleed so that the air-fuel mixture becomes rich (R). Furthermore, the speed of the air flow through the venturis 2 and 39 will be changed in response to the number of engine revolutions and the rate of vaporization of the fuel will be changed. Therefore, the degree of opening of the valve member of the valve device 38 is controlled correspondingly. The degree of opening of the valve member of the valve device 38 is set to be relatively large.

II. Starting of the engine under warm conditions:

The degree of opening of the valve member of the valve device 43 may be intermediate and is controlled so that the air-fuel mixture is intermediate (N). The degree of opening of the valve member of the valve device 38 will be relatively large and is controlled in response to the number of engine revolutions so that the engine will start even when the acelerator pedal is not depressed and the degree of opening of the throttle valve 3 is relatively small.

III. Idling condition:

The degree of opening of the valve member of the valve device 43 is controlled so as to be relatively small to thereby provide a rich air-fuel mixture (R) when the temperature is low and is controlled so as to increase to provide an intermediate air-fuel mixture (N) as the temperature increases. The degree of opening of the valve member of a valve device 38 may be intermediate and is controlled in response to the number of engine revolutions.

IV. Acceleration condition:

When the degree of opening of the throttle valve 3 is relatively large, the valve member of the valve device 43 is closed to provide a highly concentrated air-fuel mixture (R) and the degree of opening of the valve member of the valve device 38 becomes relatively large to thereby increase the quantity of the air-fuel mixture. Thus, the torque is substantially increased during acceleration. As the degree of opening of the throttle valve 43 becomes smaller, the degree of opening of the valve member of valve device 43 is increased to be relatively large to provide an intermediate air-fuel mixture (N) and the degree of opening of the valve member of valve device 38 is decreased to reduce the quantity of the air-fuel mixture to a normal amount.

V. Deceleration condition:

In order to obtain a lean air-fuel mixuture (L) the degree of opening of the valve members of valve devices 38 and 43 are set to be relatively large and are controlled in response to information received from the oxygen sensor $SE_2$.

VI. High load (power) condition:

The degree of opening of the valve member of the valve device 43 is reduced to provide a highly concentrated air-fuel mixture (R) and the degree of opening of the valve member 38 is increased to thereby increase the quantity of the air-fuel mixture so that the output of the vehicle engine will be maximized.

VII. Normal running condition:

The air-fuel mixture should be normal (N) and the valve device 43 is controlled to thereby suggest or control the quantity of bleed air so as to have the desired normal or intermediate mixture (N). In order to prevent changes in the running speed of the vehicle, the degree of opening of the valve member of valve device 38 is set at a substantially intermediate position and thereafter the degree of opening is fixed.

With respect to FIGS. 3 and 4, the microcomputer CPU reads the input data at the input ports $P_0$-$P_4$ and stores the data in resistor $RA_n$ (n=0,1,2,3,4). The stored contents of the resistor $RA_n$ is compared with the contents of the resistor $RB_n$ (n=0,1,2,3,4) wherein the previous data was stored. If the values are equal, it is not necessary to change the degree of opening of the valve members of the valve devices 38 and 43, since the operating conditions of the vehicle engine have not been changed. If, however, the values are not equal, the degree of opening of the valve members of valve devices 38 and 43 will be controlled in response to operating conditions of the vehicle engine. When the number of engine revolutions is zero or extremely low upon being started the routine of controlling the starting of the engine under cooled conditions or the routine of controlling the starting of the engine under warm conditions will be completed in response to the temperature of the engine coolant so that the data will be collected to set the degree of opening of the valve members of valve devices 38 and 43. When the number of engine revolutions is between a low value and a high value, the temperature of the engine coolant is further checked. Thus, the routine of idling control will be completed when the temperature of the engine coolant is low. If the temperature of the engine coolant is between intermediate and high, the degree of opening of the throttle valve 3 is further checked. The routine of accelerating control, power control (or normal running control) and decelerating control will be completed in response to high, intermediate and low degrees of opening of the throttle valve 3, respectively, and thus data will be collected to set the degree of opening of the valve members of the valve devices 38 and 43. The data obtained during each control routine is delivered from the output port PB and the value of the electric current through the solenoid $SL_2$ is changed to thereby change the degree of opening of the valve member of the valve device 43 to its prescribed value. If the switch SW is closed, it is considered that the mode of normal running control is set and therefore the control of the valve device 38 is not completed. If the switch SW is open, the data obtained during each control routine is delivered from the output port PA and the value of the electric current through the solenoid $SL_1$ is changed to thereby change the degree of opening of the valve member of the valve device 38.

Figure 5:
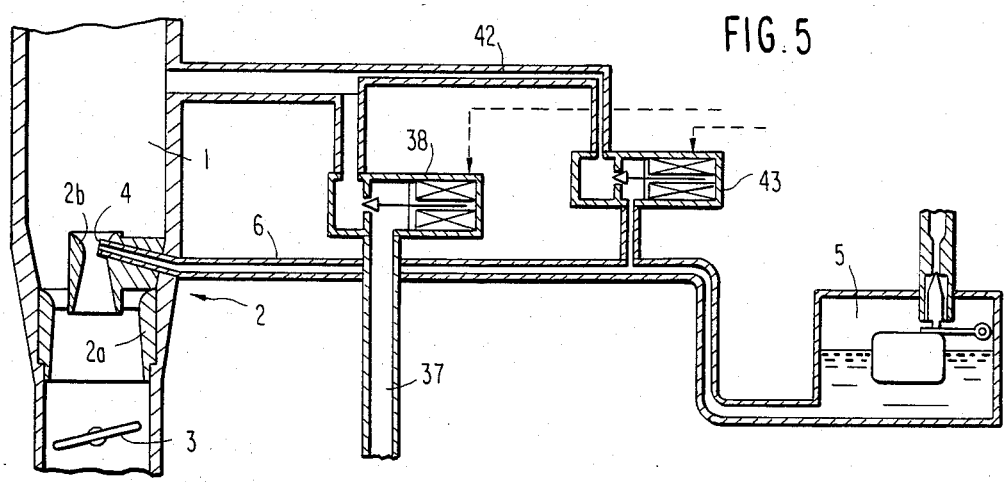
FIG. 5 is a view similar to FIG. 1 showing a modified view of the present invention.

In FIG. 5 a modified form of the present invention is illustrated wherein the fuel passage 41 of the previous embodiment is omitted and only air passes through the passage 37.

Figure 6:
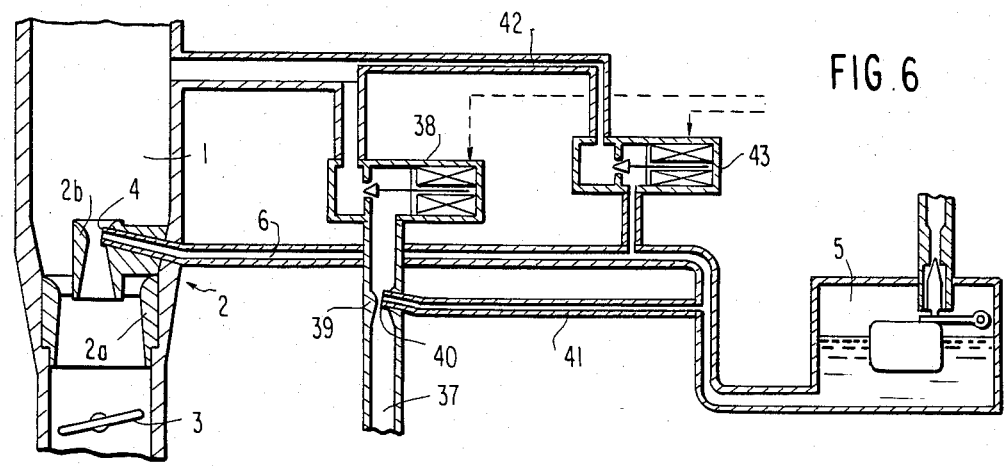
FIG. 6 is a view similar to FIG. 1 showing a further modified form of the present invention.

In the embodiment of FIG. 6, one end of the passage 42 is arranged to be open to the fuel passage 6 and thus air is bled into the main fuel supply system.

Figure 7:
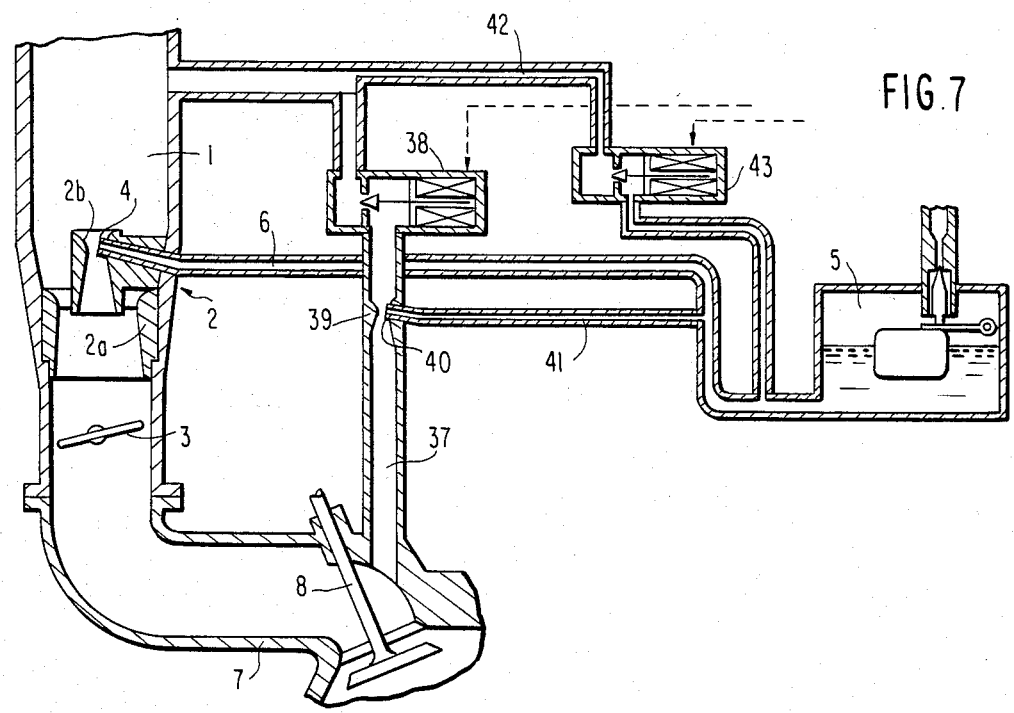
FIG. 7 is a view similar to FIG. 1 showing a still further modified form of the present invention.

In the embodiment of FIG. 7, the end of the passage 42 is arranged to communicate with the fuel passage 6 intermediate the float chamber 5 and the point where the fuel passage 41 branches off from the fuel passage 6. Accordingly, the valve device 43 can control the quantity of air bled into both fuel passages 6 and 41 at the same time.

While the invention has been particularly shown and described with reference to preferred embodiments thereof, it will be understood by those in the art that the foregoing and and other changes in form and details may be made therein without departing from the spirit and scope of the invention.

What is claimed is:

1. A carburetor for an internal combustion engine having an intake manifold and a suction valve means comprising a first air passage having an upper portion in communication with the atmosphere and a lower portion adapted to be connected to the intake manifold of an internal combustion engine, first venturi means and throttle valve means located in said first air passage, a fuel supply chamber, a first fuel passage having one end in communication with said first venturi means and the other end in communication with said fuel chamber, a second air passage having one end in communication with said intake manifold downstream of said throttle valve means and immediately upstream of said suction valve means and the other end in communication with said first air passage upstream of said first venturi means, second venturi means located in said second air passage, a first solenoid operated valve device positioned within said second air passage for controlling the flow of air therethrough, a second fuel passage having one end in communication with said second venturi means and the other end in communication with said fuel chamber, a third air passage having one end in communication with said second fuel passage and the other end in communication with said first air passage upstream of said first venturi means and a second solenoid operated valve device positioned in said third air passage to control the flow of air therethrough.

2. A carburetor as set forth in claim 1 comprising control circuit means for controlling said first and second solenoid operated valve devices comprising a microcomputer, temperature sensing means, oxygen sensing means, rotation sensing means and throttle opening sensing means operatively connected to said microcomputer for providing engine operating data to said microcomputer and output circuit means operatively connecting said microcomputer to said first and second solenoid operated valve devices for control thereof.

3. A carburetor comprising a first air passage having an upper portion in communication with the atmosphere and a lower portion adapted to be connected to the intake manifold of an internal combustion engine, said first venturi means and throttle valve means located in said first passage, a fuel supply chamber, a first fuel passage having one end in communication with said first venturi means and the other end in communication with said fuel chamber, a second air passage having one end in communication with said first air passage downstream of said throttle valve and the other end in communication with said first air passage upstream of said first venturi means, a first solenoid operated valve device positioned within said second air passage for controlling the flow of air therethrough, second venturi means in said second air passage, a second fuel passage having one end in communication with said second venturi means and the other end in communication with said fuel supply chamber, a third air passage having one end in communication with said first passage between said fuel supply chamber and the point of communication between said first and second fuel passages, and the other end in communication with said first air passage upstream of said first venturi means and a second solenoid operated valve device positioned within said third air passage for controlling the flow of air therethrough.

4. A carburetor as set forth in claim 3 comprising control circuit means for controlling said first and second solenoid operated valve devices comprising a microcomputer, temperature sensing means operatively connected to said microcomputer for providing engine operating data to said microcomputer and output circuit means operatively connecting said microcomputer to said first and second solenoid operated valve devices for control thereof.

* * * * *